UNITED STATES PATENT OFFICE.

JONAS W. AYLSWORTH, OF EAST ORANGE, NEW JERSEY, ASSIGNOR TO CONDENSITE COMPANY OF AMERICA, A CORPORATION OF NEW JERSEY.

PLASTIC COMPOSITION.

Specification of Reissued Letters Patent. Reissued Oct. 8, 1918.

14,530.

No Drawing. Original application filed May 14, 1909, Serial No. 496,060. (Patent No. 1,102,630.) Divided and application filed June 2, 1911, Serial No. 630,894. (Patent No. 1,111,285.) Divided and application filed May 2, 1912, Serial No. 694,644. (Patent No. 1,087,422, dated February 17, 1914.) Divided and this application for reissue filed January 8, 1916. Serial No. 71,097.

DIVISION A.

*To all whom it may concern:*

Be it known that I, JONAS W. AYLSWORTH, a citizen of the United States, and a resident of East Orange, in the county of Essex and State of New Jersey, have invented certain new and useful Improvements in Plastic Compositions, of which the following is a description.

The present application constitutes the first section of the reissue of my Patent No. 1087422 granted February 17, 1914, which patent is a division of my Patent No. 1,111,285, granted September 22, 1914, entitled Phenolic condensation product and method of forming same, which itself is a division of my Patent No. 1,102,630, granted July 7, 1914, entitled Composition and process of manufacturing the same. The parent Patent No. 1,102,630, relates to and describes compositions for molding various articles, such as may be made from celluloid, hard-rubber, and kindred substances, and also the production of synthetic resins. The latter is a hard fusible phenol resin made from phenol or cresol, by condensation with formaldehyde, and the former is an ultimate infusible condensation product of a phenol and formaldehyde or equivalents, preferably made from the phenol resin referred to, by reaction thereof with formaldehyde, preferably in polymerized form, in definite predetermined percentages. The ultimate, infusible product referred to, is very hard and chemically inert. It may have what I term a "solid solvent element" or "plasticity ingredient" incorporated therewith, and my divisional Patent No. 1,111,285, referred to, describes and broadly claims compositions containing such an element, and processes for making the same.

My said Patent No. 1087422 relates to and will claim such compositions containing naphthalene or various chlorin substitution products of naphthalene, as the solid solvent or plasticity ingredient. Such products, while infusible, are sufficiently plastic, on application of heat as hereinafter described, to be shaped or pressed into form at suitable temperatures. This infusible, "thermo-plastic" product, as I term it, is preferably formed from the phenol resin referred to, but a product having many of the advantages of this preferred product may be formed when various of the "shellac substitutes" or phenol resins now known are used in the place of the particular phenol resin referred to. The degree of plasticity of the composition, upon subsequent application of heat, will vary in accordance with the plasticity ingredient used, and the proportion of the same in the composition. The present application contains the same claims as said Patent No. 1087422 of which it constitutes the first section of the reissue, namely a generic claim covering compositions containing a solvent somewhat broadly expressed, and specific claims in which the solvent is a chloro-derivative of naphthalene. Naphthalene itself is not specifically claimed as a solvent herein, but is so claimed in the application which constitutes the second section of the reissue.

The fusible phenol resin, preferably used, and processes for making the same, are fully described in my parent Patent, No. 1,102,630, referred to. It is formed by the reaction of a phenol and formaldehyde in such proportions that the phenol is almost entirely combined with the formaldehyde and there is no uncombined or free formaldehyde. It is preferably heated to complete dehydration before being used as an ingredient in the making of the ultimate infusible product, which dehydration requires about 400° F. of heat at atmospheric pressure. After such dehydration and removal of excess phenol it is a hard resin, very similar in texture to copal and kauri gum. It is soluble in all proportions in acetone, amyl, ethyl, methyl and butyl alcohol, amyl, ethyl and methyl acetate, acetic acid, acetylene tetrachlorid, and mono-nitro-benzene, (oil of mirbane), from which it remains unchanged after evaporation of the solvents. It is fusible and practically unchanged when heated to 420° F. It melts about 220° F. but has no sharp melting point, passing through various degrees of viscosity, until at 250° F. it may readily be poured and at 350° F. it becomes quite thinly fluid. It acts as a weak acid toward bases with which it combines. It will not form an infusible condensation product when heated alone or with condensing agents, at any temperature. When mixed with formaldehyde, paraformaldehyde or trioxymethylene, and heated, it combines therewith and forms a hard infusible mass, which, if not admixed with other bodies, remains transparent and chemically inert. It will not, however, form such hard infusible mass when mixed with aldehydes in general, other than those mentioned, and if the percentage of formaldehyde or its polymers exceeds about 7½ per cent., when the free phenol is less than 10 per cent., when no counteracting pressure is used, the excess escapes as bubbles in the mass and renders the latter useless for some purposes.

As described in my patents referred to, the ultimate infusible product is preferably formed by incorporating with such a phenol resin as described, from 5% to 10 per cent. of the weight of the resin of polymerized, anhydrous formaldehyde, as trioxymethylene, or dioxymethylene, which is caused to dissolve therein. The phenol resin is non-water soluble, and consequently will not mix with a water solution of formaldehyde, but is a solvent when in melted or dissolved condition for anhydrous formaldehyde. A suitable amount of the final product solvent element or plasticity agent referred to is also incorporated with the mass. Substances which I have discovered to be efficacious for this purpose are naphthalene and some of its chloro derivatives, such as tetra-chloro-naphthalene. The final product solvent element contributes greater toughness to the product by counteracting the brittle nature of the ultimate product and renders the final mass plastic when heated, thus relieving internal stresses during the baking and hardening operations and subsequent cooling. By final product solvents, I include only substances which will dissolve the ultimate condensation product or combine therewith at the baking temperature, render it plastic at such temperature, and remain as a part of the product in the condition of solid solution or combination. Also, if desired, a water-combining element may be incorporated with the mass. This element takes care of traces of water which may be expelled during the baking operation. This results in a clearer and more transparent product, although I do not regard the inclusion of this element as absolutely essential. Examples of this class are benzoic anhydrid, phthalic anhydrid, and any such organic anhydrids as are soluble in and miscible with the mass, and are not decomposed at temperatures used. Having obtained the above mixture the same may be cast in suitable molds for the formation of the desired articles or for the formation of rods, sheets, tubes, or slabs, or the like, from which the desired articles may subsequently be made by heat and pressure, or by forming by tools. The molds and their contents are heated sufficiently to transform the product into a hard, infusible, chemically inert substance, the temperature to which the same is heated in practice varying between 260° and 400° Fahrenheit, depending on the treatment of the phenol resin before mixing, the character of the water-combining element and the product solvent, and the character of the molded article. The heating may be accomplished by casting in suitable steam-jacketed molds, or by placing the molds and contents in suitable ovens for a time sufficient to allow the mixture to interact and harden. This time may vary within wide limits, depending on the thickness of the article and the character of the mass. Thin sheets and small articles may be hardened in a few minutes, while larger masses and objects of special character may require gradual heating to the lowest temperature necessary for the reaction to take place and continued heating at such temperature, or at an elevated temperature, for several hours. The ultimate product so formed will not melt at any temperature below that of its decomposition, but will soften and become sufficiently plastic at from 240° to 300° F. to be further shaped by pressing in suitable dies or molds. The degree of plasticity may be controlled to a certain extent by the nature of the solvent ingredient and proportions thereof, and by varying the proportions of the polymerized formaldehyde, added to the phenol resin.

In the mixture of ingredients the polymerized formaldehyde is used in an amount which is sufficient to combine with nearly all the resin, so that there may be no excess of formaldehyde or polymer thereof to cause bubbling of the mass during the hardening operation. Such an amount may vary between 5 and 7½ per cent. of the weight of phenol resin used. Formaldehyde not polymerized, may be used in place of the polymerized substance, in which case the polymerized formaldehyde is formed by evaporation during the process. It is usually impractical to make the phenol resin entirely free from uncombined phenol, and the small variable percentage of phenol makes it necessary in the formation of the mixture for the ultimate product to vary the percentage of dioxymethylene, trioxymethylene, or para-formaldehyde in the mixture with the resin, in accordance with the percentage of free phenol, ascertained by test. The phenol combines with a much greater proportion of polymerized formaldehyde than does the phenol resin. By varying the percentage of the polymerized formaldehyde as indicated, the free phenol in the phenol resin may all be taken into combination. The product thus obtained after heating the phenol resin and the other elements mentioned in proper proportions to a temperature of from 280° to 400° F. or higher, as stated in my patents referred to, has various advantages over similar products, notably in that it softens sufficiently to allow further shaping, as stated, at a temperature between 240° F. and 300° F., while at the same time it is infusible at any temperature lower than that of its decomposition, and also in that it is tougher and less brittle in texture. These results are largely attributable to the presence of the solid solvent or plasticity agent described. The product also has other advantages, as described in the patents referred to, in that it can be made of exact and definite ultimate composition, under perfect control, by the process particularly described, without the necessity of counteracting pressure, and the product so formed is unusually free from gas bubbles.

The mass of the ultimate condensation product is normally of amber color and transparent. It may be made practically colorless if special precautions are taken to exclude color-giving impurities from the phenol and to exclude oxygen during subsequent heat treatment. It may also, if desired, be given any desired color by the addition of suitable pigments. Chemically inert cheaper substances in powdered or fibrous form may be incorporated with the mass before baking in widely varying per cents. when desired.

Preferred formulæ for masses which are to be hardened in molds without subsequent pressing operations are as follows:—

For light colored and transparent products.

| | | |
|---|---|---|
| Phenol resin | | 100 parts by weight. |
| Naphthalene | 5 to 10 | " " " |
| Polymerized formaldehyde | 5 to 7 | " " " |
| Phenol resin | | 100 " " " |
| Benzoic anhydrid | 2 to 4 | " " " |
| Naphthalene | 5 to 10 | " " " |
| Tri-oxymethylene | 5 to 8 | " " " |

For non-melting plastic compositions.

| | | |
|---|---|---|
| Phenol resin | | 100 parts by weight. |
| Naphthalene | 10 to 40 | " " " |
| Paraformaldehyde | 5 to 10 | " " " |
| Phenol resin | | 100 " " " |
| Naphthalene | 10 to 20 | " " " |
| Benzoic anhydrid | 1 to 5 | " " " |
| Paraformaldehyde | 5 to 10 | " " " |
| Phenol resin | | 100 " " " |
| Tetra-chloro-naphthalene | 10 to 25 | " " " |
| Benzoic anhydrid | 1 to 5 | " " " |
| Paraformaldehyde | 5 to 8 | " " " |

The specific gravity of a similar composition, given as example, was found to be as follows:—

| | | |
|---|---|---|
| Phenol resin | 100 parts by weight. | Specific gravity 1.324 Opalescent amber color. |
| Tetra-chloro-naphthalene | 20 " " " | |
| Paraformaldehyde | 8 " " " | |

The specific gravity of the phenol resin used was found to be 1.240. This substance is transparent and varies in tint from colorless to a dark coffee shade.

In all of the formulæ given above for the ultimate condensation product, the ingredients are mixed and freed from air bubbles by standing in molten condition or by vacuum treatment or by centrifugal treatment at temperatures below 250° F. or freed from air bubbles in any other suitable manner. The mass is then poured into molds and is preferably heated to a temperature of from 260° F. to 270° F. at which temperature it is maintained for a sufficient time to render the mass infusible, and subsequently is heated for a short time to a temperature of 300° to 350° F. The ingredients may also be heated to from 320° to 350° F. under counteracting pressure, as is done in the art of vulcanizing rubber. When no counteracting pressure is used, from one-half to four hours is required before the final temperature may be reached, this time varying with the thickness of the object molded.

Naphthalene, when in solid solution with the ultimate condensation product, does not volatilize perceptibly at ordinary temperatures, when within the proportions given in the examples, although naphthalene does tend to volatilize slowly when alone. The chloro-naphthalenes referred to, when in solid solution with the ultimate condensation product, do not volatilize either at room temperatures or at 212° F. Naphthalene and the chloro derivatives are also practically insoluble in water at room temperatures. The practical non-water-solubility of the solvent or plasticity ingredients referred to is a valuable feature, because such ingredients cannot be removed from the mass to any appreciable extent, by water, even when the mass is in comminuted form, and furthermore masses made including such ingredients are not so susceptible to the influence of moisture in the atmosphere as are compositions containing ingredients such as glycerin, which are soluble to a very great extent in water. Condensation products containing glycerin, for example, constantly attract moisture from the atmosphere, because of the hygroscopic nature of the glycerin. The plasticity ingredients referred to also all have melting points substantially lower than their boiling points which is an important property, since thereby all the ingredients of the composition can be mixed in fluid condition, and the plasticity ingredient used will not volatilize away during the mixing or hardening reaction.

When naphthalene or equivalent solid solvent is employed in considerable proportion, for instance, in the ratio of 10 to 40 parts by weight of naphthalene to 100 parts by weight of the phenol resin, I find that as the percentage of naphthalene approaches and reaches the maximum figure stated, the composition is characterized by being liquid at somewhat above normal temperatures, and therefore will be of value for such industrial uses as may make an initial liquid of liquefiable condition desirable. At the same time the naphthalene or other solvent remains, for the greater part at least, incorporated in the final mass, which is elastic while hot. I find that in compositions using considerable proportions of naphthalene, the chemical reaction under the influence of heat takes place without substantial evaporation, the final product being an infusible, more or less gelatinous mass, softening under the effects of heat. Very long application of heat may harden it further, without however removing entirely the property of softening by heat, which imparts to it elasticity or flexibility. On account of its high boiling point, the solvent remains in the mass, harmless and unexpelled throughout the range of working temperatures, so that the objectionable reduction of volume or shrinkage by evaporation which occurs unavoidably whenever low boiling point solvents, like alcohol are used, does not interfere; furthermore, it brings about the increased elasticity, a most desirable factor, which contributes still further to prevent interior stresses. The above observations are particularly pertinent with respect to the second section, above referred to, of the present reissue.

The term "fusible" appearing in the claims as qualifying a product such as my phenol resin, denotes a product which melts and becomes liquid, when sufficiently heated, under atmospheric pressure. The term "infusible" in the claims of this application, as qualifying my ultimate product, denotes a substance which does not flow or become liquid, when heated to any temperature, under atmospheric pressure. When an ultimate product solvent element is added, or an excess of phenol resin is used as a solvent for the ultimate product, as stated, the mass becomes sufficiently plastic to be readily pressed or molded to shape, but does not fuse.

This application covers, as stated, compositions containing naphthalene or various derivatives thereof as the solid solvent or plasticity ingredient. The chloro derivatives are specifically claimed herein, and generic claims are also made, designed to cover naphthalene itself and such derivatives, which are capable of performing the desired solid solvent and plasticity function in the composition, the nitro derivatives of naphthalene being specifically claimed in my Patent No. 1,111,285 referred to. As a suitable basis for such generic claims, it will be noted that naphthalene and its derivatives of the class referred to are condensed ring compounds having two closed chains with carbon atoms common to both, which limitation is peculiarly descriptive of the substances referred to.

The word "phenol" as employed in the claims is intended to include the equivalents of phenol for the purposes of this invention, and the word "formaldehyde" is intended to include the polymers and other recognized equivalents of formaldehyde.

Having now described my invention what I claim as new and desire to protect by Letters Patent is:—

1. As a new composition of matter, a solid solution of an ultimate infusible phenolic condensation product and a solid solvent therefor consisting of a condensed ring compound having two closed chains with carbon atoms common to both.

2. As a new composition of matter, a solid solution of an ultimate infusible phenolic condensation product and tetra-chloronaphthalene.

3. As a new composition of matter, a solid solution of an ultimate infusible phenolic condensation product and a non-volatile solid higher chloro derivative of naphthalene.

This specification signed and witnessed this 29th day of December, 1915.

JONAS W. AYLSWORTH.

Witnesses:

DYER SMITH,

FREDERICK BACHMANN.